July 3, 1956 I. MARON ET AL 2753,529
ELECTROMECHANICAL RESONATOR
Filed July 28, 1955
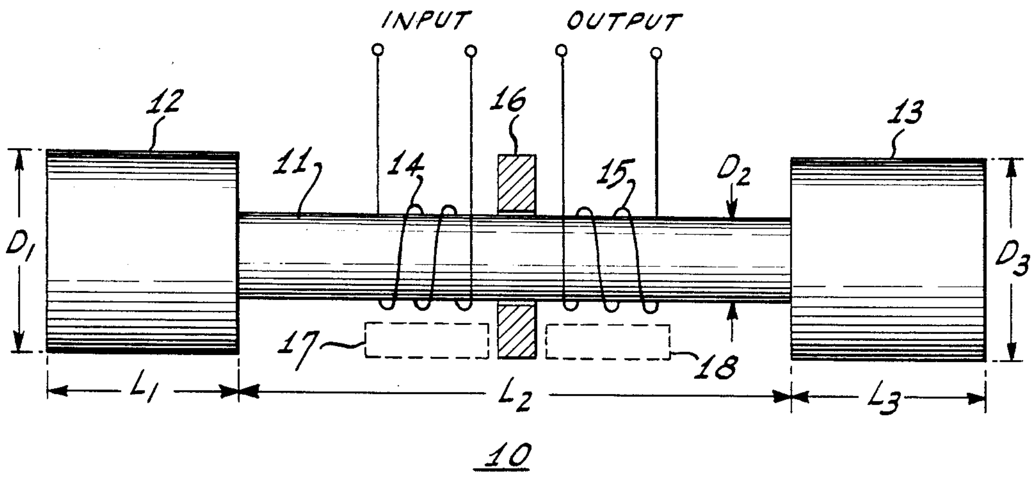
INVENTORS
IRVING MARON AND
LESTER M. GLICKMAN
BY Charles H. Brown
ATTORNEY United States Patent Office 2,753,529

Patented July 3, 1956

2,753,529

ELECTROMECHANICAL RESONATOR

Irving Maron, Haddonfield, and Lester M. Glickman, Camden, N. J., assignors to Radio Corporation of America, a corporation of Delaware Application July 28, 1955, Serial No. 524,883

7 Claims. (Cl. 333—71)

The invention relates to electromechanical resonators, and particularly to magnetostrictive resonators for use in low frequency electromechanical filters.

Conventional low frequency electromechanical filters are of relatively large physical size. For example, a conventional electromechanical filter made of nickel and designed to operate in the torsional mode and to have a mid-band resonant frequency of 10 kilocycles would be approximately 6 inches long. A similar filter having a mid-band frequency of 1 kilocycle would be approximately 60 inches long.

Accordingly, an object of the invention is to provide an improved and compact electromechanical resonator for use at relatively low frequencies.

In accordance with the invention, an electromechanical resonator is comprised of a cylindrical resonator element of length L and diameter $d_2$ to which a cylindrical terminating element of length $L/2$ and diameter $d_1$ is fastened at each end. The elements have dimensions that satisfy the relation:

$$f=\frac{\tan^{-1}\sqrt{1/\phi}}{\pi L}.v$$

where $f$ is the mid-bend frequency of the resonator, $v$ is the velocity of propagation in the resonator for the type of vibration excited, $$\phi=\left(\frac{d_1}{d_2}\right)^4$$

for a resonator vibrating in the torsional mode, and $$\phi=\left(\frac{d_1}{d_2}\right)^2$$

for a resonator vibrating in the longitudinal mode. Either mode of vibration may be excited in the resonator.

The invention is described in detail in connection with the accompanying drawing which shows a preferred embodiment of the invention. In the drawing, an electromechanical resonator 10 is shown. Such a resonator can be used either as an electromechanical filter, or as a frequency determining device in an oscillator circuit. The resonator 10 is made of suitable magnetostrictive material such as Ni-Span C (an alloy comprising iron and nickel, and currently made by the International Nickel Co.) or nickel, and comprises a cylindrically shaped resonator element 11 having a first cylindrically shaped terminating element 12 axially mounted at one end and a second cylindrically shaped terminating element 13 axially mounted at the other end. The resonator element 11 and the terminating elements 12, 13 may either be made from a single piece of material or may be made separately from similar or different materials and assembled. The resonator element 11 has a length $L_2$ and a diameter $D_2$, the first terminating element 12 has a length $L_1$ and a diameter $D_1$, and the second terminating element 13 has a length $L_3$ and a diameter $D_3$.

An input coil 14 and an output coil 15 are magnetostrictively coupled to the resonator element 11 near its center. For optimum operation, the input and output coils 14, 15 are placed as close to the center of the resonator element 11 as practical without introducing significant direct coupling between the coils 14, 15. Although not shown, capacitors may be connected in parallel with the coils 14, 15 to provide circuits at the input and output coils 14, 15 that are parallel resonant at the mid-band frequency of the resonator 10. If desired, the input and output coils 14, 15 may be shielded from each other by a magnetic shield 16 shown in section between the input and output coils 14, 15. The input and output coils 14, 15 are coupled to the resonator element 11 near its center since the center is an area of high stress. The resonator 10 can be mounted or supported at the mid-point of the resonator element 11 (which is an area of low motion), such as by the magnetic shield 16. If the resonator 10 is to be operated in the torsional mode, circular bias may be supplied by passing a direct current through the resonator 10 between its ends. If the resonator 10 retains enough residual bias (that is, becomes permanently biased), the current need not be maintained. If the resonator 10 is to be operated in the longitudinal mode, longitudinal bias may be supplied by a direct current in the input and output coils 14, 15, or by magnets 17, 18 (indicated in dashed lines) positioned on opposite sides of the shield 16 and adjacent to the resonator element 11 in the vicinity of the input and output coils 14, 15 respectively.

In accordance with the invention, the dimensions of the resonator 10 must satisfy the following relation:

$$Z_1 \sin\theta_1 \cos\theta_2 \cos\theta_3 + Z_2 \cos\theta_1 \sin\theta_2 \cos\theta_3 + Z_3 \cos\theta_1 \cos\theta_2 \sin\theta_3 - \frac{Z_1 Z_2}{Z_3} \sin\theta_1 \sin\theta_2 \sin\theta_3 = 0$$

In the relation $Z_1$ is the characteristic impedance (i. e. the ratio of stress to motion for an infinitely long, lossless material) of the first terminating element 12, $Z_2$ is the characteristic impedance of the resonator element 11, and $Z_3$ is the characteristic impedance of the second terminating element 13. Also in the relation, $$\theta_1=\frac{2\pi f L_1}{v}$$

$$\theta_2=\frac{2\pi f L_2}{v}$$

and $$\theta_3=\frac{2\pi f L_3}{v}$$

where $f$ is the mid-band frequency of the resonator, $L_1$, $L_2$, and $L_3$ are the lengths previously defined, and $v$ is the velocity of propagation in the material used in the resonator for the particular mode of vibration being used.

For a resonator made from one type of material and operating in the longitudial mode, $$Z_1=\frac{\pi D_1^4\sqrt{p.G}}{32}$$

$$Z_2=\frac{\pi D_2^4\sqrt{p.G}}{32}$$

and $$Z_3=\frac{\pi D_3^4\sqrt{p.G}}{32}$$

where $D_1$, $D_2$, and $D_3$ are the diameters previously defined, $p$ is the mass density of the material used in the resonator, and G is the modulus of shear of the material used in the resonator. It will be noted that the characteristic impedances of the elements of a resonator operating in the torsional mode may be varied by varying the diameters of the elements. The impedances may also be varied by using different materials in the elements, thus varying their mass densities and their moduli of shear.

For a resonator made from one type of material and operating in the longitudinal mode, $$Z_1=\frac{\pi D_1^2}{4}pv$$

$$Z_2=\frac{\pi D_2^2}{4}pv$$

and $$Z_3=\frac{\pi D_3^2}{4}pv$$

where $p$ is the mass density of the material used in the resonator, and $v$ is the longitudinal velocity of propagation for the material used in the resonator. It will be noted that the characteristic impedances of the elements of such a filter may be varied by using different materials in the elements.

The relations given above may be greatly simplified by assuming a resonator in which the lengths of the two terminating elements are substantially equal to each other, and the diameters of the two terminating elements are substantially equal to each other, and by further assuming that the length of the resonator element is substantially twice the length of the individual terminating elements. Under such an assumption, $$f=\frac{\tan^{-1}\sqrt{1/\phi}}{\pi L}v$$

In the above relation, $f$ and $v$ are the frequency and velocity previously defined, and L is the length of the resonator element. For a resonator operating in the torsional mode $$\phi=\left(\frac{d_1}{d_2}\right)^4$$

where $d_1$ is the diameter of the terminating elements and $d_2$ is the diameter of the resonator element. For a resonator operating in the longitudinal mode, $$\phi=\left(\frac{d_1}{d_2}\right)^2$$

where $d_1$ and $d_2$ are the diameters just defined.

In designing this type of resonator, it is generally desirable to fix the overall length of the resonator element and the terminating element. Then, knowing the desired mid-band or resonant frequency of the resonator and the constants of the material being used in the resonator, the required diameter ratio may be computed. As an example, it is assumed that a resonator is to have a resonant frequency of 5 kilocycles, an overall length of 1.2 inches, and is to vibrate in the torsional mode. Also, it is assumed that the resonator is to be made of nickel which has a velocity of propagation of 119,250 inches per second in the torsional mode. If the length of the resonator element is assumed to be twice as great as the length of the individual terminating elements, then $$f=\frac{\tan^{-1}\sqrt{1\phi}}{\pi L}.v$$

which by transposing becomes $$\tan^{-1}\sqrt{1/\phi}=\frac{\pi f L}{v}$$

If the assumed values are substituted in this relation, then $$\tan^{-1}\sqrt{1/\phi}=0.0792$$

or $$\sqrt{1/\phi}=0.0788$$

By definition, $$\phi=\left(\frac{d_1}{d_2}\right)^4$$

hence, $$\sqrt{1/\phi}=\left(\frac{d_2}{d_1}\right)^2=0.0788$$

Solving, $$\frac{d_2}{d_1}=0.281$$

or $$d_1=3.56d_2$$

If $d_2$ is made some practical value to permit its manufacture, say 0.1 inch, then $d_1$ should be made 0.356 inch.

A resonator constructed in accordance with the above example has a pass band between the 3 db points of approximately 2 or 3 cycles at the resonant frequency. If desired, the Q of the material may be lowered by mechanically damping the resonator at the ends of the terminating elements, or electrically damping the resonator by inserting a resistor in parallel with each of the coils 14, 15.

In addition, to being very small and compact, resonators constructed in accordance with the invention have other advantages. Their mid-band frequencies may be varied as much as 50 kilocycles by changing their diameter ratios, which may be any value. In addition, because of a phase shift that occurs in the region where the diameters change, these resonators do not have higher harmonically related response frequencies as do conventional low frequency resonators. However, if a particular response is desired, the fundamental response frequency and the next higher response frequency may be set at any desired non-integral ratio within the range of the resonator.

I claim:

1. An electromechanical resonator, comprising at least one resonator element terminated at each end thereof and having dimensions that satisfy the relations:

$$Z_1\sin\theta_1\cos\theta_2\cos\theta_3+Z_2\cos\theta_1\sin\theta_2\cos\theta_3+ Z_3\cos\theta_1\cos\theta_2\sin\theta_3-\frac{Z_1Z_2}{Z_3}\sin\theta_1\sin\theta_2\sin\theta_3=0$$

$$\theta_1=\frac{2\pi f L_1}{v}$$

$$\theta_2=\frac{2\pi f L_2}{v}$$

and $$\theta_3=\frac{2\pi f L_3}{v}$$

where $Z_1$ and $Z_3$ are the characteristic impedances of the terminations respectively, $Z_2$ is the characteristic impedance of said resonator element, $L_1$ and $L_3$ are the lengths of said terminations respectively, $L_2$ is the length of said resonator element, $f$ is the mid-band frequency of said resonator, and $v$ is the velocity of propagation in said resonator for the type vibration excited therein.

2. An electromechanical resonator, comprising a cylindrical magnetostrictive resonator element having a first cylindrical terminating element at one end thereof and a second cylindrical terminating element at the other end thereof, said elements having dimensions that satisfy the relations:

$$Z_1\sin\theta_1\cos\theta_2\cos\theta_3+Z_2\cos\theta_1\sin\theta_2\cos\theta_3+ Z_3\cos\theta_1\cos\theta_2\sin\theta_3-\frac{Z_1Z_2}{Z_3}\sin\theta_1\sin\theta_2\sin\theta_3=0$$

$$\theta_1=\frac{2\pi f L_1}{v}$$

$$\theta_2=\frac{2\pi f L_2}{v}$$

and $$\theta_3=\frac{2\pi f L_3}{v}$$

where $Z_1$ and $Z_3$ are the characteristic impedances of said first and second terminating elements respectively, $Z_2$ is the characteristic impedance of said resonator element, $L_1$ and $L_3$ are the lengths of said first and second terminating elements respectively, $L_2$ is the length of said resonator element, $f$ is the mid-band frequency of said resonator, and $v$ is the velocity of propagation in said resonator for the type of vibration excited therein.

3. A torsionally vibrating electromechanical resonator, comprising a cylindrically magnetostrictive resonator element having a first cylindrical terminating element at one end thereof and a second cylindrical terminating element at the other end thereof, said elements being made of the same material and having dimensions that satisfy the relations:

$$Z_1 \sin\theta_1 \cos\theta_2 \cos\theta_3 + Z_2 \cos\theta_1 \sin\theta_2 \cos\theta_3 + Z_3 \cos\theta_1 \cos\theta_2 \sin\theta_3 - \frac{Z_1 Z_2}{Z_3} \sin\theta_1 \sin\theta_2 \sin\theta_3 = 0$$

$$Z_1 = \frac{\pi D_1^4}{32}\sqrt{pG}$$

$$Z_2 = \frac{\pi D_2^4}{32}\sqrt{pG}$$

$$Z_3 = \frac{\pi D_3^4}{32}\sqrt{pG}$$

$$\theta_1 = \frac{2\pi f L_1}{v}$$

$$\theta_2 = \frac{2\pi f L_2}{v}$$

and $$\theta_2 = \frac{2\pi f L_3}{v}$$

where $D_1$ is the diameter of said first terminating element, $D_2$ is the diameter of said resonator element, $D_3$ is the diameter of said second terminating element, $p$ is the mass density of the material in said resonator, $G_1$ is the modulus of shear of said first terminating element, $G_2$ is the modulus of shear of said resonator element, $G_3$ is the modulus of shear of said second terminating element, $L_1$ is the length of said first terminating element, $L_2$ is the length of said resonator element, $L_3$ is the length of said second terminating element, $f$ is the mid-band frequency of said resonator, and $v$ is the velocity of propagation in said material for the torsional mode of vibration.

4. A longitudinally vibrating electrochemical resonator, comprising a cylindrical magnetostrictive resonator element having a first cylindrical terminating element at one end thereof and a second cylindrical terminating element at the other end thereof, said elements being made of the same material and having dimensions that satisfy the relations:

$$Z_1 \sin\theta_1 \cos\theta_2 \cos\theta_3 + Z_2 \cos\theta_1 \sin\theta_2 \cos\theta_3 + Z_3 \cos\theta_1 \cos\theta_2 \sin\theta_3 - \frac{Z_1 Z_2}{Z_3} \sin\theta_1 \sin\theta_2 \sin\theta_3 = 0$$

$$Z_1 = \frac{\pi D_1^2}{4} pv$$

$$Z_2 = \frac{\pi D_2^2}{4} pv$$

$$Z_3 = \frac{\pi D_3^2}{4} pv$$

$$\theta_1 = \frac{2\pi f L_1}{v}$$

$$\theta_2 = \frac{2\pi f L_2}{v}$$

and $$\theta_3 = \frac{2\pi f L_3}{v}$$

where $p$ is the mass density of said material in said resonator, $f$ is the mid-band frequency of said filter, $L_1$ is the length of said first terminating element, $L_2$ is the length of said resonator element, $L_3$ is the length of said second terminating element, and $v$ is the velocity of propagation in said material for the longitudinal mode of vibration.

5. A torsionally vibrating electromechanical resonator, comprising a cylindrical magnetostrictive resonator element of length L and diameter $d_2$ and having first and second cylindrical terminating elements of substantially equal lengths $L/2$ and equal diameters $d_1$ respectively at each end thereof, said elements being made of the same material and having dimensions that satisfy the relations:

$$f = \frac{\tan^{-1}\sqrt{1/\phi}}{\pi L} v$$

and $$\phi = \left(\frac{d_1}{d_2}\right)^4$$

where $f$ is the mid-band frequency of said resonator, and $v$ is the velocity of propagation in said resonator for the torsional mode of vibration.

6. A longitudinally vibrating electromechanical resonator, comprising a cylindrical magnetostrictive resonator element of length L and diameter $d_2$ and having first and second cylindrical terminating elements of substantially equal lengths $L/2$ and equal diameters $d_1$ respectively at each end thereof, said elements being made of the same material and having dimensions that satisfy the relations:

$$f = \frac{\tan^{-1}\sqrt{1/\phi}}{\pi L} v$$

and $$\phi = \left(\frac{d_1}{d_2}\right)^2$$

where $f$ is the mid-band frequency of said resonator, and $v$ is the velocity of propagation in said resonator for the longitudinal mode of vibration.

7. An electromechanical resonator, comprising a cylindrical magnetostrictive resonator element of length L and diameter $d_2$ and having first and second cylindrical terminating elements of substantially equal lengths $L/2$ and equal diameters $d_1$ respectively at each end thereof, said elements being made of the same material and having dimensions that satisfy the relations:

$$f = \frac{\tan^{-1}\sqrt{1/\phi}}{\pi L} \cdot v$$

and $$\phi = \left(\frac{d_1}{d_2}\right)^n$$

Where $f$ is the mid-band frequency of said resonator, $v$ is the velocity of propagation in said resonator for the type of vibration excited therein, $n$ is two when said resonator operates in the longitudinal mode of vibration, and $n$ is four when said resonator operates in the torsional mode of vibration, means for supporting said resonator element at its center, and input and output coils positioned in energy transfer relation to said resonator elements adjacent said supporting means and oppositely disposed relative thereto.

References Cited in the file of this patent

UNITED STATES PATENTS 2,202,391 Mason ---------------- May 28, 1940

2,231,404 Blackman et al. ---------- Feb. 11, 1941